H. H. C. ARNOLD.
Cover for Goblets or Cups.
No. 209,851. Patented Nov. 12, 1878.
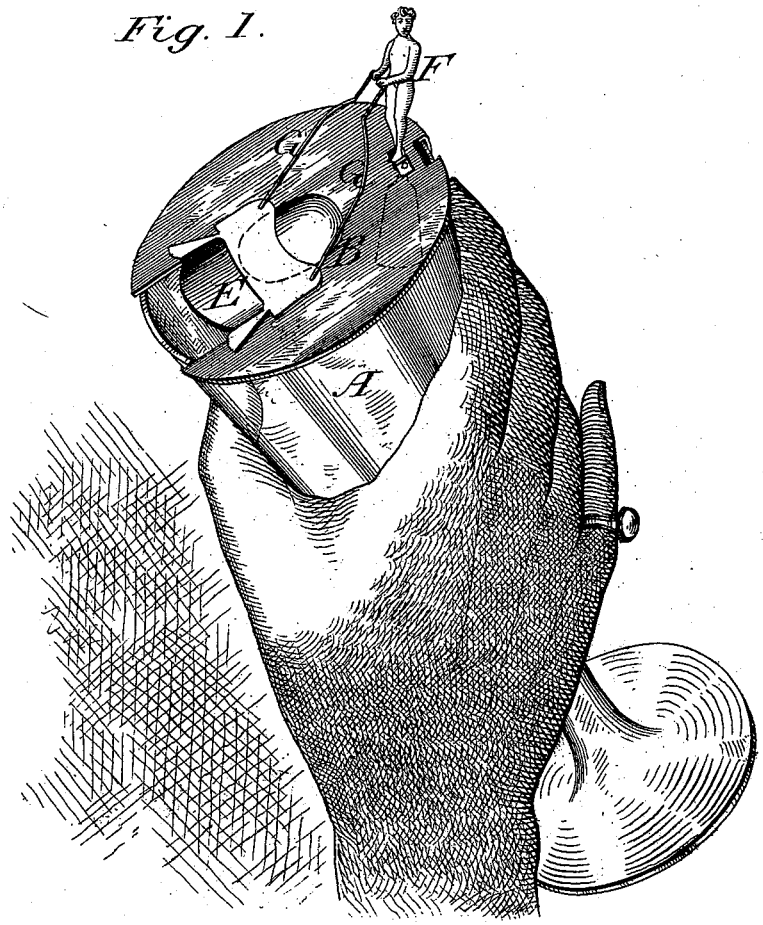
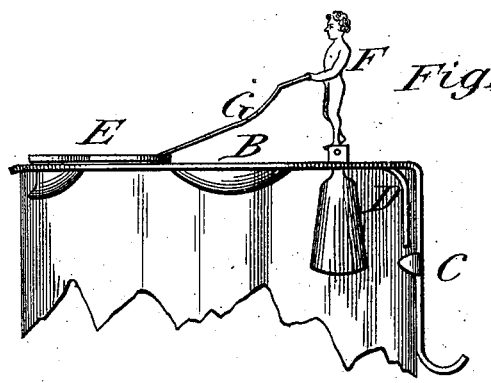
Attest:
C. B. New.
J. D. Trinum
Inventor:
Hudson H. C. Arnold

UNITED STATES PATENT OFFICE.

HUDSON H. C. ARNOLD, OF LEBANON, TENNESSEE.

IMPROVEMENT IN COVERS FOR GOBLETS OR CUPS.

Specification forming part of Letters Patent No. 209,851, dated November 12, 1878; application filed September 19, 1878.

*To all whom it may concern:*

Be it known that I, HUDSON H. C. ARNOLD, a native of Jessamine county, Kentucky, now at Lebanon, in the county of Wilson and State of Tennessee, have invented a new and valuable Improvement in Covers for Goblets and Cups, Constituting a Mustache and Fly Guard; and I do hereby declare that the following is a full, clear, and exact description of the construction and operation of the same, reference being had to the drawings, making a part of this specification, and to the letters of reference marked thereon.

Figure 1 of the drawings is a representation of perspective view of my mustache and fly guard. Fig. 2 is a side and under view of the same.

The object of this invention is to provide goblets or cups from which beverages are drank with a cover which has a sliding mouth-piece, operated back and forth by means of a self-acting lever, and which serves as a mustache guard and fly-guard. This object is accomplished by the following devices, constructed, combined, arranged, and operating substantially as hereinafter set forth.

In the accompanying drawings, A designates a goblet or cup suitable for drinking beverages from, and which may be made of glass, china, silver, or any other proper material. Its shape and ornamentation may also vary to suit the tastes of the manufacturer or purchaser. B designates a cover for said goblet or cup. Said cover B has a finger-rest, C, and tongue D formed on its rear end, by means of which it is attached to, and kept in proper position on, the goblet or cup. Said cover B has a sliding mouth-piece, E, concaved to admit the mouth to the cup. Said cover B has a sufficient portion of its fore part cut away to allow said mouth-piece E to operate back and forth freely. Said mouth-piece E is operated back and forth by means of a self-acting lever, F, and arms G G. Said cover B has a depression at or near the center to prevent the nose coming in contact with said cover B when drinking from the cup. In rear of said depression cover B has a flanged slot. In said slot the self-acting lever F is pivoted to cover B. Attached to sliding mouth-piece E are wire arms G G. Said wire arms G G are also attached to the upper part of self-acting lever F in any suitable manner. Said self-acting lever F is made sufficiently heavy below the pivot to operate the sliding mouth-piece E back and forth by means of the wire arms G G. The said cover B and sliding mouth-piece E may be made of any suitable sheet metal, or may be molded into proper shape of any suitable metal, or proper composition of metal, or any other suitable material, and may be perforated and ornamented, or neither.

The self-acting lever F may be made of any suitable metal, china, glass, or any other proper suitable material, and may have any suitable ornament formed on or attached to its upper end, suitably constructed to receive and properly operate arms G G, attached to mouth-piece E.

When it is desired to drink from the goblet or cup, it is grasped in the usual manner. The forefinger rests conveniently on the finger-rest C, and when the cup is tipped sufficiently to get at the contents the self-acting lever F assumes a perpendicular position, and by means of the wire arms G G, attached to sliding mouth-piece E, draws back the said mouth-piece E, and the beverage flows freely into the mouth, while the said mouth-piece E effectually prevents the mustache coming in contact with the beverage.

When the cup is again placed upon the table or held in an upright position, the self-acting lever F, by means of arms G G, forces the sliding mouth-piece E forward until it comes in contact with the inner side of the goblet or cup, thus adjusting itself to any thickness the goblet or cup may be made, and effectually prevents flies getting into the contents of the goblet or cup.

The above-described cover B, finger-rest C, tongue D, mouth-piece E, self-acting lever F, and arms G G may be readily attached to or removed from any goblet or cup.

What I claim as new, and desire to secure by Letters Patent, is—

1. The combination, with goblets and cups for beverages, of a cover which has a sliding mouth-piece, operated by a self-acting lever, whereby said mouth-piece may be drawn back sufficiently to allow the beverage to flow freely into the mouth, and at the same time prevent the mustache coming in contact with the beverage, and again closing up to prevent flies getting into the contents of the goblet or cup, substantially as set forth.

2. The combination of cover B, finger-rest C, and tongue D, substantially as set forth.

3. The combination of mouth-piece E, self-acting lever F, and arms G G, substantially as set forth.

4. The combination of cover B, finger-rest C, tongue D, sliding mouth-piece E, self-acting lever F, and arms G G, substantially as and for the purpose set forth.

In testimony that I claim the above I have hereunto subscribed my name in the presence of two witnesses.

HUDSON H. C. ARNOLD.

Witnesses:
C. B. NEW,
J. D. TRINUM.